US012565810B2

(12) United States Patent
Brondex et al.

(10) Patent No.: US 12,565,810 B2
(45) Date of Patent: Mar. 3, 2026

(54) ELECTROMECHANICAL ACTUATOR, COVERING DEVICE AND CLOSURE, COVERING OR SOLAR PROTECTION INSTALLATION COMPRISING SUCH AN ELECTROMECHANICAL ACTUATOR OR SUCH A COVERING DEVICE

(71) Applicant: SOMFY ACTIVITES SA, Cluses (FR)

(72) Inventors: Adrien Brondex, Cluses (FR); Nicolas Hafner, Cluses (FR); Etienne Bruet, Cluses (FR)

(73) Assignee: SOMFY ACTIVITES SA, Cluses (FR)

( * ) Notice: Subject to any disclaimer, the term of this patent is extended or adjusted under 35 U.S.C. 154(b) by 348 days.

(21) Appl. No.: 18/255,266

(22) PCT Filed: Dec. 1, 2021

(86) PCT No.: PCT/EP2021/083834
§ 371 (c)(1),
(2) Date: May 31, 2023

(87) PCT Pub. No.: WO2022/117679
PCT Pub. Date: Jun. 9, 2022

(65) Prior Publication Data

US 2024/0003185 A1 Jan. 4, 2024

(30) Foreign Application Priority Data

Dec. 2, 2020 (FR) ....................................... 2012553
Mar. 31, 2021 (FR) ....................................... 2103355

(51) Int. Cl.
*E06B 9/72* (2006.01)
*E06B 9/42* (2006.01)

(52) U.S. Cl.
CPC . *E06B 9/72* (2013.01); *E06B 9/42* (2013.01)

(58) Field of Classification Search
CPC ................. E06B 9/72; E06B 9/42; E06B 9/68
See application file for complete search history.

(56) References Cited

U.S. PATENT DOCUMENTS 10,597,940 B2 * 3/2020 Lemaitre .................. E06B 9/42
10,938,268 B2 * 3/2021 Meynet .................... E06B 9/42
(Continued)

FOREIGN PATENT DOCUMENTS

EP 3 288 054 A1 2/2018
FR 3 072 116 A1 4/2019
WO WO-2016135015 A1 * 9/2016 ............... E06B 9/88

OTHER PUBLICATIONS

International Search Report and Written Opinion, dated Mar. 17, 2022, corresponds to PCT/EP2021/083834.
(Continued)

*Primary Examiner* — Beth A Stephan
(74) *Attorney, Agent, or Firm* — NIXON & VANDERHYE

(57) ABSTRACT

An electromechanical actuator for driving a winding tube of a closure, occultation or solar protection installation includes at least a casing, a torque support arranged at a first end of the casing, an electric power supply lead, an electric motor, an electronic control unit including at least an electronic board, and a cover mounted on a torque support head, including a base and a lateral face. The electronic board is disposed inside a housing of the torque support, the cover closing the housing. The torque support includes a mounting plate fixed to one end of the torque support head by being mounted in a cutout in the lateral face of the cover. The mounting plate is provided with an opening collaborating with a projecting part of a fixed support of a holding device in order to take up the load applied by the electromechanical actuator.

13 Claims, 9 Drawing Sheets

(56) References Cited

U.S. PATENT DOCUMENTS

| | | | | |
|---|---|---|---|---|
| 11,236,545 | B2 * | 2/2022 | Sonzini | E06B 9/72 |
| 11,280,132 | B2 * | 3/2022 | Sonzini | E06B 9/50 |
| 11,293,221 | B2 * | 4/2022 | Tan | E06B 9/50 |
| 2015/0034259 | A1 * | 2/2015 | Bohlen | E06B 9/62 160/310 |
| 2015/0300088 | A1 * | 10/2015 | Lemaitre | E06B 9/64 242/390 |
| 2015/0333510 | A1 | 11/2015 | Mullet et al. | |
| 2017/0006740 | A1 * | 1/2017 | Holt | E06B 9/68 |
| 2017/0241201 | A1 * | 8/2017 | Buccola, Jr. | H02K 7/003 |
| 2018/0106102 | A1 * | 4/2018 | Holt | E06B 9/42 |
| 2019/0145166 | A1 * | 5/2019 | Campagna | E06B 9/44 160/310 |
| 2020/0165866 | A1 | 5/2020 | Holt et al. | |
| 2020/0300032 | A1 | 9/2020 | Tan et al. | |
| 2020/0303988 | A1 | 9/2020 | Meynet et al. | |
| 2021/0285286 | A1 * | 9/2021 | Schuehmacher | F16F 1/3732 |

OTHER PUBLICATIONS

FR Search Report, dated Sep. 6, 2021 corresponds to FR 2012553.

FR Search Report, dated Jan. 13, 2022 corresponds to FR 2103355.

* cited by examiner

ELECTROMECHANICAL ACTUATOR, COVERING DEVICE AND CLOSURE, COVERING OR SOLAR PROTECTION INSTALLATION COMPRISING SUCH AN ELECTROMECHANICAL ACTUATOR OR SUCH A COVERING DEVICE

CROSS-REFERENCE TO RELATED APPLICATIONS

This application is the US national stage of international patent application PCT/EP2021/083834 filed on Dec. 1, 2021, which in turn claims the priority of FR 2103355 and FR 2012553, filed Mar. 31, 2021 and Dec. 2, 2020, respectively, the entirety of which are incorporated herein by reference.

BACKGROUND OF THE INVENTION

Field of the Invention

The present invention relates to an electromechanical actuator for a closing, shading or solar protection system, i.e. an electromechanical actuator of a closure, occultation or solar protection system, as well as a motorized driving device comprising such an actuator. The invention also relates to a closure, occultation or solar protection installation comprising a screen which is driven to move by such an electromechanical actuator or which includes such a motorized driving device.

In general, the present invention relates to the field of occultation devices comprising a motorized driving device moving a screen between at least one first position and at least one second position.

Description of the Related Art

A motorized driving device generally comprises an electromechanical actuator of a movable closure, occultation, or solar protection element, such as a shutter, door, gate, blind, or any other equivalent equipment, hereinafter referred to as a screen.

Electromechanical actuators for closure, occultation or solar protection systems are already known, comprising a casing, a torque support, an electric power supply lead, an electric motor, an electronic control unit and a cover. The torque support is arranged at one end of the casing and collaborates with a holding device to take up the load applied by the electromechanical actuator. The power supply lead is configured to be connected to an electrical energy supply network. The electric motor is mounted inside the casing and is supplied with electrical energy by means of the power supply lead. The electronic control unit comprises at least one electronic board arranged inside the torque support. The cover is mounted on a torque support head.

When installing such electromechanical actuators, it is common to have to adapt the torque support to a support of the holding device. There is a wide variety of supports, with different shapes, with which the torque support must be compatible in order to be mounted.

It is common practice to add an adaptor to the torque support, allowing the connection between the torque support and the holding device's support, without having to adapt the shape of the torque support. Such an adapter is usually attached to one end of the torque support.

However, the disadvantage of these adapters is that they are inserted between the torque support and the holding device's support, which creates an extra thickness at the end of the electromechanical actuator. This extra thickness leads to a gap around the screen, between the screen and a lateral edge of an opening on which the closure, occultation or solar protection system is mounted, resulting in light leakage. Thus, the shading created by the screen is lower. Therefore, the addition of an adapter is not aesthetically pleasing and does not provide satisfactory shading.

SUMMARY OF THE INVENTION

The present invention aims to solve these drawbacks and to propose an electromechanical actuator, as well as a closure, occultation or solar protection installation comprising such an electromechanical actuator, which can be easily adapted to the support of a holding device without degrading the shading provided by a screen belonging to the installation.

In this respect, the present invention is directed, according to a first aspect, to an electromechanical actuator for driving a winding tube of a closure, occultation or solar protection installation, the electromechanical actuator comprising at least:

- a casing,
- a torque support, the torque support being arranged at a first end of the casing,
- an electrical power supply lead, the power supply lead being configured to be connected to an electrical energy supply network,
- an electric motor, the electric motor being mounted within the casing, the electric motor being supplied with electrical power via the electrical power supply lead,
- an electronic control unit comprising at least one electronic board,
- a cover, the cover being mounted on a torque support head, comprising a base and a lateral face.

According to the invention, the electronic board is arranged inside a housing of the torque support, the cover closing the housing of the torque support. In addition, the torque support comprises a mounting plate, the mounting plate being fixed to one end of the torque support head by being mounted in a cutout in the lateral face of the cover. In addition, the mounting plate is provided with an opening configured to collaborate with a projecting part of a fixed support of a holding device to take up the load applied by the electromechanical actuator.

Owing to the invention, the mounting plate is integrated into the electromechanical actuator so that it does not protrude from the cover and does not create an overhang at the end of the electromechanical actuator. This means that the distance between the support of the holding device and the electromechanical actuator is minimal, which improves the shading provided by the screen of an installation comprising such an electromechanical actuator.

According to advantageous but not mandatory aspects of the invention, the electromechanical actuator incorporates one or more of the following features, used in isolation or in any combination that is technically feasible:

- The mounting plate holds the assembled cover to the torque support.
- The cover comprises a rim, the mounting plate comprises a shoulder, the rim and shoulder are complementary in shape and, in the assembled configuration of the electromechanical actuator, the shoulder abuts against the rim.
- The mounting plate and cover are independently interchangeable.

An outer surface of the mounting plate is flush with the lateral face of the cover.

The two main faces of the mounting plate are substantially flat, without relief and parallel to each other.

The torque support further comprises an opening, configured to receive various projecting parts of differently shaped supports, and the opening of the mounting plate is aligned with the opening of the torque support.

The opening of the mounting plate comprises at least one support surface.

The opening of the mounting plate comprises a plurality of arms, each arm having two bearing surfaces.

The torque support comprises brackets, configured to hold the torque support relative to a holding device, the mounting plate comprises indentations of complementary shape to the shape of the brackets, and in the assembled configuration of the electromechanical actuator, the brackets of the torque support are arranged in the indentations of the mounting plate.

The base of the cover includes at least one opening configured to face electronic components carried by the electronic board.

According to a second aspect, the present invention relates to a occultation device for a closure, occultation or solar protection installation, comprising a winding tube, a screen that can be wound up on the winding tube, an electromechanical actuator driving the screen to move and a holding device including at least one fixed support, the electromechanical actuator being according to the invention and as mentioned above and the opening of the plate being shaped complementary to the shape of a projecting part of the fixed support and configured to receive this projecting part.

According to a third aspect, the present invention relates to a closure, occultation or solar protection installation comprising a screen that can be rolled up on a winding tube and driven to move by an electromechanical actuator, the electromechanical actuator being according to the invention and as mentioned above, or the installation comprising a occultation device according to the invention and as mentioned above.

This occultation device and this installation have similar features and advantages to those described above in relation to the electromechanical actuator according to the invention.

BRIEF DESCRIPTION OF THE DRAWINGS

Further features and advantages of the invention will become apparent from the following description, made with reference to the attached drawings, which are given as non-limiting examples and wherein.

DETAILED DESCRIPTION

Figure 1:
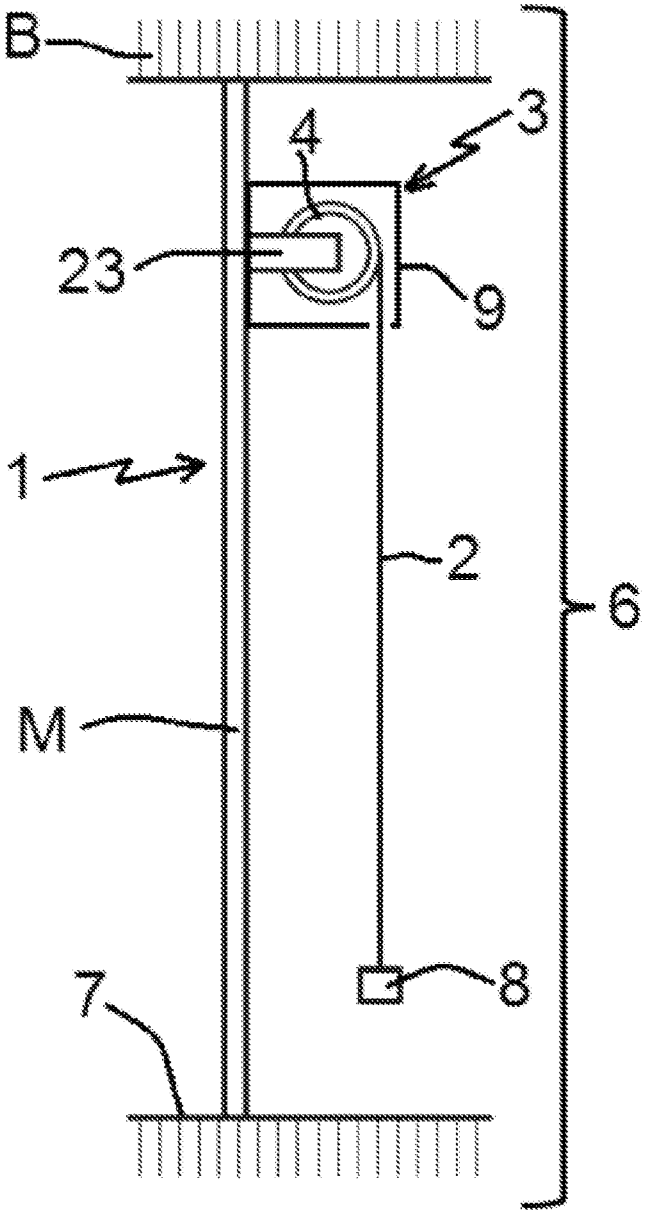
FIG. 1 is a schematic transverse cross-section view of a occultation installation according to the invention.
Figure 2:
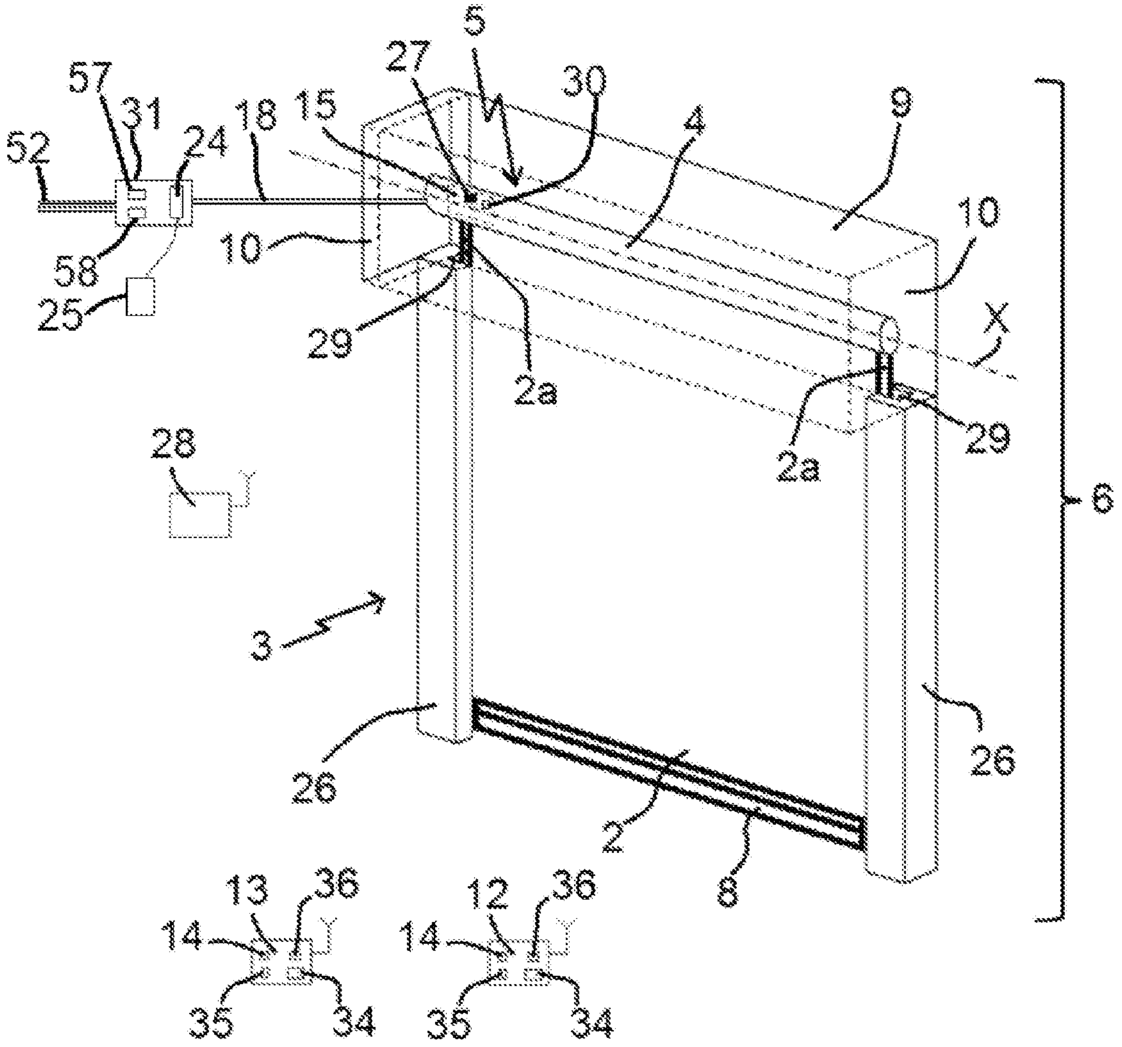
FIG. 2 is a schematic perspective view of the installation illustrated in FIG. 1.

Firstly, with reference to FIGS. 1 and 2, an installation 6 comprising a closure, occultation or solar protection device 3, this installation being according to a first embodiment of the invention, installed in a building B comprising an opening 3, which is a window or door, is described. This installation 6 is equipped with a screen 2 belonging to the closure, occultation or solar protection device 3, in particular a motorised blind.

The closure, occultation or solar protection device 3 is hereinafter referred to as the "occultation device". The occultation device 3 comprises the screen 2.

The occultation device 3 may comprise a blind, such as a rollable canvas, pleated blind or slatted blind. The present invention is applicable to all types of occultation devices.

With reference to FIGS. 1 and 2, a roller blind which comprises an electromechanical actuator according to the first embodiment of the invention is described.

The occultation device 3 comprises a winding tube 4 and a motorized driving device 5. The motorized driving device 5 comprises an electromechanical actuator 11 illustrated in FIG. 4.

The screen 2 of the occultation device 3 is rolled onto the winding tube 4 driven by the motorized driving device 5. Thus, the screen 2 can be moved between a rolled position, in particular a high position, and an unrolled position, in particular a low position.

The screen 2 of the occultation device 3 is a closure, occultation, and/or solar protection screen which can be wound and unwound around the winding tube 4, the inner diameter of which is greater than the outer diameter of the electromechanical actuator 11, so that the electromechanical actuator 11 can be inserted into the winding tube 4 when the occultation device 3 is assembled.

Advantageously, the occultation device 3 further comprises a holding device 9, 23.

Advantageously, the holding device 9, 23 may comprise two fixed supports 23. A fixed support 23 is arranged at each end of the winding tube 4, in particular in an assembled configuration of the occultation device 3.

Thus, the winding tube 4 is held by the fixed supports 23. Only one of the fixed supports 23 is visible in FIG. 1. The fixed supports 23 allow the occultation device 3 to be mechanically connected to the structure of the building B, in particular to the wall M of the building B.

Advantageously, the holding device 9, 23 may comprise a box 9. In addition, the winding tube 4 and at least part of the screen 2 are housed inside the box 9, in particular in the assembled configuration of the occultation device 3.

Generally, the box 9 is arranged above the opening 1, or at the upper part of the opening 1.

Here, as illustrated in FIG. 1, the fixed supports 23 are also housed inside the box 9.

Advantageously, the box 9 comprises two cheeks 10, as illustrated in FIG. 2. One cheek 10 is arranged at each end of the box 9, particularly in the assembled configuration of the occultation device 3.

In a variant, as illustrated in FIG. 2, the winding tube 4 is held via the box 9, in particular via the cheeks 10 of the box 9, without using supports, such as the fixed supports 23 mentioned above.

Advantageously, the occultation device 3 may also comprise two lateral slides 26, as shown only in FIG. 2. Each lateral slide 26 comprises a groove 29. Each groove 29 of one of the lateral slides 26 collaborates, i.e. is configured to collaborate, with a lateral edge 2*a* of the screen 2, particularly in the assembled configuration of the occultation device 3, so as to guide the screen 2, during the rolling and unrolling of the screen 2 around the winding tube 4.

The electromechanical actuator 11 is for example of the tubular type. This allows the winding tube 4 to be rotated about an axis of rotation X, so that the screen 2 of the occultation device 3 can be unrolled or rolled.

Thus, the screen 2 can be rolled and unrolled on the winding tube 4. In the installed state, the electromechanical actuator 11 is inserted into the winding tube 4.

The occultation device 3 further comprises a load bar 8 for exerting tension on the screen 2.

The roller blind, which forms the occultation device 3, comprises a canvas, which forms the screen 2 of the roller blind 3. A first end of the screen 2, particularly the upper end of the screen 2, in the assembled configuration of the occultation device 3, is fixed to the winding tube 4. Furthermore, a second end of the screen 2, particularly the lower end of the screen 2, in the assembled configuration of the occultation device 3, is fixed to the load bar 8.

Here, the canvas forming the screen 2 is made of a textile material.

In an embodiment not shown, the first end of the screen 2 has a hem through which a rod, in particular one made of plastic, is arranged. This hem at the first end of the screen 2 is achieved by sewing the canvas forming the screen 2. When assembling the screen 2 to the winding tube 4, the hem and the rod at the first end of the screen 2 are slid into a groove on the outside of the winding tube 4, in particular over the entire length of the winding tube 4, so that the screen 2 is rigidly connected to the winding tube 4 and can be wound up when assembling the screen 2 to the winding tube 4.

In any case, the first end of the screen 2 is arranged at the holding device 9, 23, such that this first end remains above the opening 1 in the assembled configuration of the occultation device 3.

In the case of a roller blind, the upper rolled position corresponds to a predetermined upper end-of-travel position, or to the bearing of the load bar 8 of the screen 2 against an edge of a box 9 of the roller blind 3, and the lower unrolled position corresponds to a predetermined lower end-of-travel position, or to the bearing of the load bar 8 of the screen 2 against a threshold 7 of the opening 1, or to the complete unrolling of the screen 2.

Advantageously, the motorized driving device 5 is commanded by a command unit. The command unit can be, for example, a local command unit 12 or a central command unit 13.

Advantageously, the local command unit 12 can be connected to the central command unit 13 via a wired or wireless connection.

Advantageously, the central command unit 13 can control the local command unit 12 and other similar local command units distributed throughout the building.

The motorized driving device 5 is preferably configured to execute the commands for closing or opening the screen 2 of the occultation device 3, which can be issued, in particular, by the local command unit 12 and/or the central command unit 13.

The installation 6 comprises the local command unit 12, the central command unit 13, or both the local command unit 12 and the central command unit 13.

The electromechanical actuator 11 belonging to the installation 6 of FIGS. 1 and 2 is now described in more detail with reference to FIGS. 3 and 4.

The electromechanical actuator 11 comprises an electric motor 16. The electric motor 16 is shown by its outline in FIG. 4, without details of its internal components, which are known per se.

Here, the electric motor 16 comprises a rotor and a stator, not shown and positioned coaxially around the axis of rotation X of the winding tube 4 in the mounted configuration of the motorized driving device 5.

Means for commanding the electromechanical actuator 11, allowing the movement of the screen 2 of the occultation device 3, comprise at least one electronic control unit 15. This electronic control unit 15 is able to turn on the electric motor 16 of the electromechanical actuator 11 and, in particular, to enable the supply of electrical energy to the electric motor 16.

Thus, the electronic control unit 15 commands, in particular, the electric motor 16, so as to open or close the screen 2, described previously.

The means of commanding the electromechanical actuator 11 comprise hardware and/or software means.

As a non-limiting example, the hardware means may comprise at least one microcontroller 30.

Advantageously, the electronic control unit 15 further comprises a first communication module 27, in particular for receiving command orders, the command orders being issued by a command emitter, such as the local command unit 12 or central command unit 13, these orders being intended to control the motorized driving device 5.

Advantageously, the first communication module 27 of the electronic control unit 15 is wireless. In particular, the first communication module 27 is configured to receive radio command orders.

Advantageously, the first communication module 27 may also allow the reception of command orders transmitted by wired means.

Advantageously, the electronic control unit 15, the local command unit 12 and/or the central command unit 13 can be in communication with a weather station located inside the building B or remote outside the building B, including, in particular, one or more sensors that can be configured to determine, for example, temperature, brightness, or wind speed, in the case where the weather station is placed outside the building B.

Advantageously, the electronic control unit 15, the local command unit 12, and/or the central command unit 13 can also be in communication with a server 28, as illustrated in FIG. 2, so as to control the electromechanical actuator 11 according to data made available remotely via a communication network, in particular an Internet network that can be connected to the server 28.

The electronic control unit 15 can be controlled from the local command unit 12 and/or central command unit 13. The local command unit 12 and/or central command unit 13 is provided with a control keyboard. The control keyboard of the local 12 or central 13 command unit comprises one or more selection elements 14 and, optionally, one or more display elements 34.

By way of non-limiting examples, the selection elements may include push buttons and/or touch-sensitive keys. The display elements may comprise light emitting diodes and/or an LCD display (Liquid Crystal Display) or TFT (Thin Film Transistor) display. The selection and display elements can also be realised by means of a touch screen.

The local 12 and/or central 13 command unit comprises at least a second communication module 36.

Thus, the second communication module 36 of the local command unit 12 or central command unit 13 is configured to emit, i.e. emits, command orders, in particular by wireless means, e.g. radio, or by wired means.

Furthermore, the second communication module 36 of the local command unit 12 or central command unit 13 may also be configured to receive, i.e. receives, command orders, in particular via the same means.

The second communication module 36 of the local command unit 12 or central command unit 13 is configured to communicate, i.e. communicates, with the first communication module 27 of the electronic control unit 15.

Thus, the second communication module 36 of the local command unit 12 or central command unit 13 exchanges command orders with the first communication module 27 of the electronic control unit 15, either monodirectionally or bidirectionally.

Advantageously, the local command unit 12 is a command point, which may be fixed or mobile. A fixed command point can be a control box to be fixed on a façade of a wall M of the building B or on a face of a window or door frame. A mobile command point can be a remote control, a smartphone or a tablet.

Advantageously, the local 12 and/or central 13 command unit further comprises a controller 35.

The motorized driving device 5, in particular the electronic control unit 15, is preferably configured to carry out command orders for controlling the movement, in particular the closing and opening, of the screen 2 of the occultation device 3. These command orders can be emitted, for example, by the local command unit 12 or by the central command unit 13.

The motorized driving device 5 can be controlled by the user, for example by receiving a command order corresponding to pressing the or one of the selection elements 14 of the local command unit 12 or central command unit 13.

The motorized driving device 5 can also be controlled automatically, for example by receiving a command order corresponding to at least one signal from at least one sensor, not shown, and/or a signal from a clock, not shown, of the electronic control unit 15, in particular the microcontroller 30. The sensor and/or the clock may be integrated in the local command unit 12 or in the central command unit 13.

The electromechanical actuator 11 comprises a casing 17, in particular a tubular one. The electric motor 16 is mounted inside the casing 17, in particular in an assembled configuration of the electromechanical actuator 11.

Here, the casing 17 of the electromechanical actuator 11 is cylindrical in shape, in particular rotationally symmetrical about the axis of rotation X.

In one embodiment, the casing 17 is made of a metallic material.

The material of the electromechanical actuator casing is not limiting and can be different. In particular, it may be a plastic material.

Advantageously, the occultation device 3 further comprises an electrical energy supply device 31.

Here, the electromechanical actuator 11 is configured to be electrically connected, i.e. is electrically connected, to the electrical energy supply device 31.

The electromechanical actuator 11 further comprises electrical conductors 37.

Figure 4:
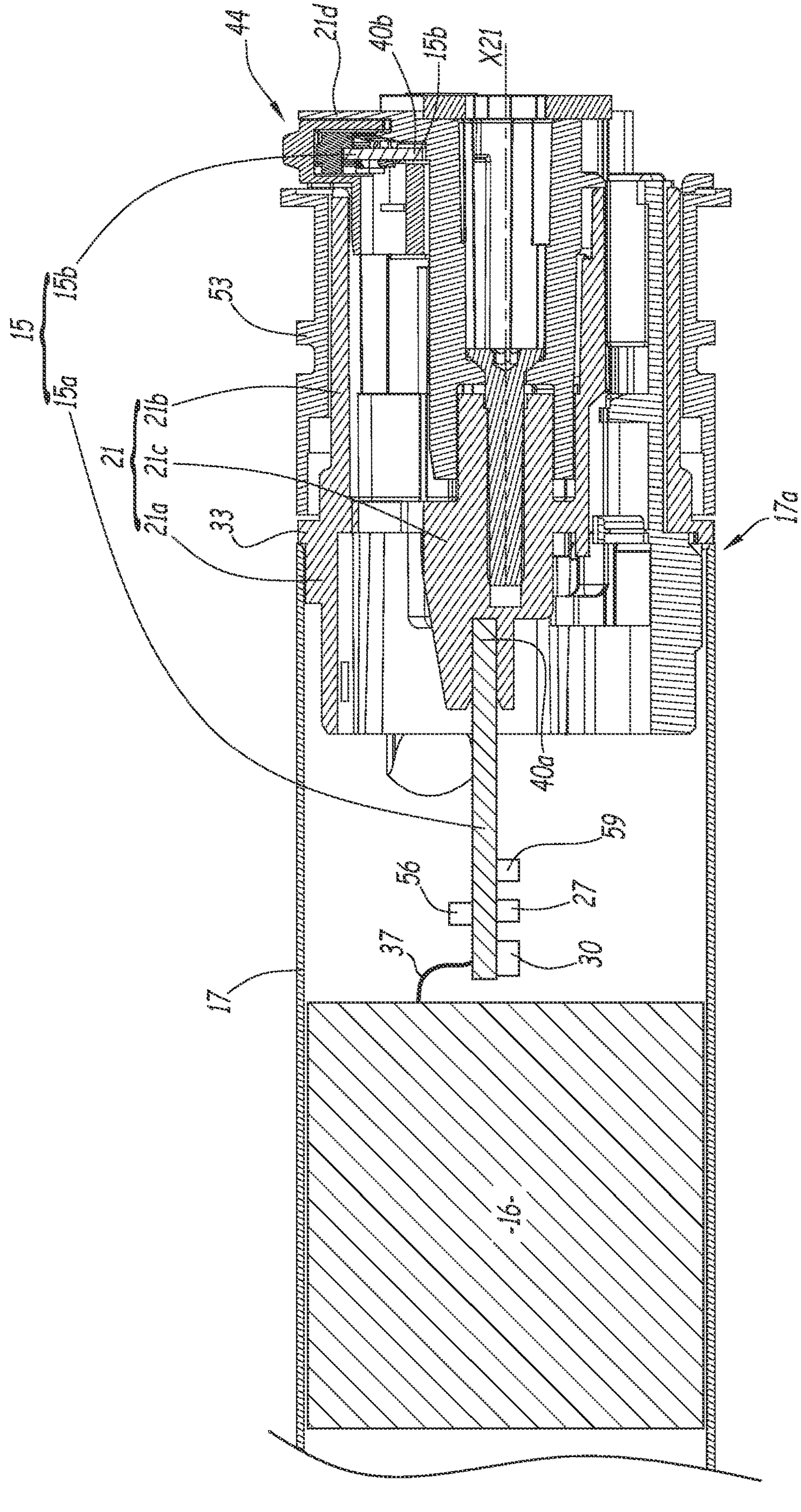
FIG. 4 is a partial longitudinal cross-section of the electromechanical actuator illustrated in FIG. 3.

Here, the electrical conductors 37 extend between the electronic control unit 15 and the electric motor 16, as illustrated in FIG. 4.

The electromechanical actuator 11 further comprises an electrical power supply lead 18.

The electrical conductors 37 are configured to be connected to an electrical energy supply network 52, by means of the power supply lead 18.

The electric motor 16 is supplied with electrical power via the electrical conductors 37, which are in turn electrically connected to the power supply lead 18.

Thus, the electric motor 16 is configured to be supplied, i.e. is supplied, with electrical energy from the electrical energy supply network 52, through the power supply lead 18.

Figure 3:
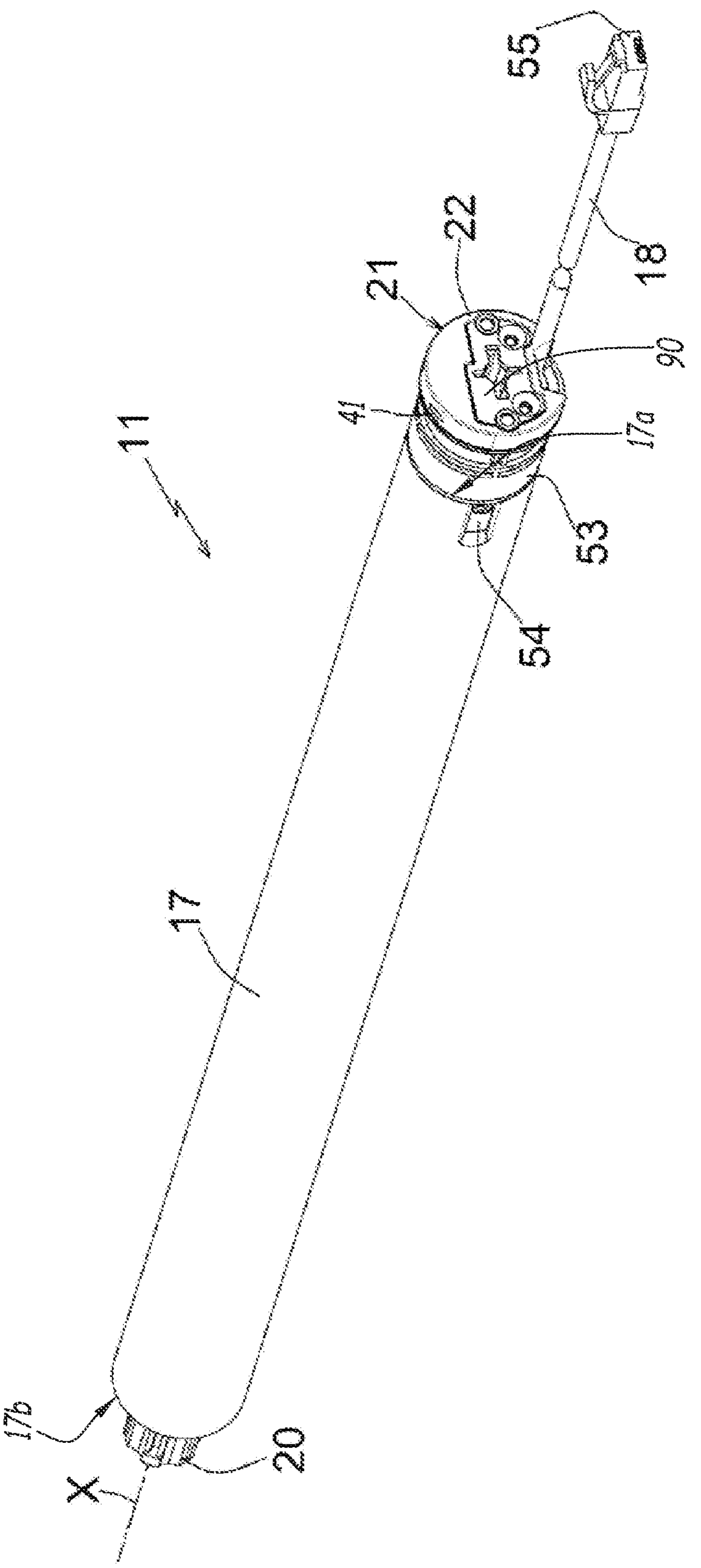
FIG. 3 is a perspective schematic view of an electromechanical actuator according to the invention and belonging to the installation illustrated in FIGS. 1 and 2.

Advantageously, the power supply lead 18 is connected to the electrical energy supply network 52 by means of an electrical connector 55, visible in FIG. 3.

In this way, the electrical conductors 37 of the electromechanical actuator 11 are configured to be electrically connected, i.e. are electrically connected, to the power supply lead 18.

Here, the electromechanical actuator 11 further comprises the electronic control unit 15.

Advantageously, the electronic control unit 15 comprises a first electronic board **15*a* and a second electronic board 15*b***.

Advantageously, the electronic control unit 15 and, more particularly, each of the first and second electronic boards **15*a*, 15*b* comprises at least one printed circuit board 40*a*, 40*b***.

Advantageously, the or each printed circuit board **40*a*, 40*b* is equipped with electronic components 56**.

The electrical conductors 37 are made by means of electrical wires and/or electrical tracks of the or each printed circuit board **40*a*, 40*b* of the electronic control unit 15. Only the part of the electrical conductors 37 made of electrical wires is visible in FIG. 4**.

Advantageously, the electronic components 56 comprise the first communication module 27 and the microcontroller 30.

The power supply lead 18 comprises an electrical connector 59, which is configured to electrically connect, i.e. electrically link, the power supply lead 18 to the electronic control unit 15, in particular to the first and second electronic boards **15*a*, 15*b* and, more particularly, to the printed circuit board 40*a*, 40*b* of each of these first and second electronic boards 15*a*, 15*b***.

Here, the power supply lead 18, is electrically connected, i.e. is configured to be electrically connected, to electrical tracks, not shown, of the first printed circuit board **40*a* by means of the electrical connector 59 of the power supply lead 18**.

Here, the voltage of the electrical energy supply network 52 is, preferably, continuous and called "very low voltage". The value of the voltage of the electrical energy supply network 52 is, preferably, less than or equal to 120 volts and, more particularly, less than or equal to 50 volts. The value of the voltage of the electrical energy supply network 52 may be, for example, on the order of 12 volts, 24 volts or 48 volts.

As a non-limiting example, the electrical energy supply network 52 may be a "PoE" (Power over Ethernet) network.

Here, the electric motor 16 may be of the electronically commutated brushless type, also known as "BLDC" (Brush-Less Direct Current) or "permanent magnet synchronous", or DC type.

Advantageously, the electrical energy supply device 31 may comprise at least one battery 24.

The battery 24 can be arranged in the box 9 of the occultation device 3. The battery 24 can thus be arranged inside or outside the box 9. The battery 24 may also be arranged inside the winding tube 4, but outside the casing 17. The electromechanical actuator 11 may also comprise the battery 24. The battery 24 may thereby be arranged inside the casing 17, in particular in an assembled configuration of the electromechanical actuator 11.

Advantageously, the electrical energy supply device 31 may further comprise at least one hub 57 and, optionally, at least one adapter 58, in particular in the case where the electromechanical actuator 11 is configured to be electrically connected, i.e. is electrically connected, to a so-called "PoE" power supply network.

Advantageously, the electrical power supply lead 18 is configured to supply electrical energy, i.e. supplies electrical energy, to the electromagnetic actuator 11, in particular to the electronic control unit 15 and the electric motor 16, in particular from the electrical energy supply device 31, in particular from the battery 24.

Advantageously, the battery 24 comprises one or more energy storage cells. The energy storage cells of the battery 24 may be, for example, rechargeable batteries, in which case the battery 24 is of the rechargeable type, or cells.

Advantageously, the motorized driving device 5 and, in particular, the electronic control unit 15, comprises charging elements configured to charge the battery 24 from the electrical energy supplied by an external electrical energy supply source 25, as illustrated in FIG. 2.

Advantageously, the external electrical energy supply source 25 is a charger that can be connected, i.e. is connected, to a wall socket, so as to recharge the battery 24 from a mains electrical energy supply.

Advantageously, the first electronic board **15*a* is configured to control the electric motor 16. In addition, the second electronic board 15*b* is configured to access functions for setting parameters and/or configuring the electromechanical actuator 11, by means of selection devices 41 and, possibly, display devices 42, not shown. In addition, the second electronic board 15*b* may be configured to allow recharging of the battery 24**.

Here, and by no means restrictively, the loading elements are arranged on the second electronic board **15*b***.

The electromechanical actuator 11 further comprises an output shaft 20.

Advantageously, the electromechanical actuator 11 further comprises a gearbox, not shown, which comprises at least one reduction stage. The reduction stage can be an epicyclic gear train. The gearbox is configured to be arranged, i.e. is arranged, between the electric motor 16 and the output shaft 20.

The type and number of reduction stages of each of the gearbox are not limiting.

Advantageously, the electromechanical actuator 11 further comprises a brake, not shown.

By way of non-limiting example, the brake can be a spring brake, a cam brake, a magnetic brake, or an electromagnetic brake.

The brake is configured to brake and/or rotationally lock the output shaft 20 so as to regulate the rotational speed of the winding tube 4 when the screen 2 is moved, and to keep the winding tube 4 locked, when the electromechanical actuator 11 is electrically deactivated.

The brake is configured to be arranged, i.e. is arranged, between two reduction stages of the gearbox, or between the electronic control unit 15 and the electric motor 16, i.e. at the input of the electric motor 16, or between the gearbox and the output shaft 20, i.e. at the output of the gearbox, or between the electric motor 16 and the gearbox, i.e. at the output of the electric motor 16.

Advantageously, the gearbox, and potentially, the brake are arranged inside the casing 17 of the electromechanical actuator 11, in the assembled configuration of the electromechanical actuator 11.

The winding tube 4 is rotated about the axis of rotation X and the casing 17 of the electromechanical actuator 11 and is supported by two pivot connections.

The first pivot connection is made at a first end of the winding tube 4 by means of a ring 53. The ring 53 thus makes it possible to create a bearing.

The second pivot connection, not shown, is made at a second end of the winding tube 4.

The electromechanical actuator 11 further comprises a torque support 21, which may also be called the "actuator head".

Here, the torque support 21 is arranged on the first end **17*a* of the casing 17 of the electromechanical actuator 11, particularly in the assembled configuration of the electromechanical actuator 11**.

The torque support 21 makes it possible to take up the load applied by the electromechanical actuator 11 and, in particular, to ensure that the load applied by the electromechanical actuator 11, in particular the torque applied by the electromechanical actuator 11, are absorbed by the building structure B. Advantageously, the torque support 21 also allows the load applied by the winding tube 4, in particular the weight of the winding tube 4, the electromechanical actuator 11 and the screen 2, to be taken up and to ensure that this load is absorbed by the building structure B.

The torque support 21 of the electromechanical actuator 11 thus allows the electromechanical actuator 11 to be fixed to a holding device 9, 23, in particular to one of the fixed supports 23 or to one of the cheeks 10 of the box 9.

Advantageously, the torque support 21 protrudes from the first end **17*a* of the casing 17 of the electromechanical actuator 11, in particular the end 17*a* of the casing 17 receiving the ring 53. The ring 53 constitutes, or is configured to constitute, a bearing for the rotational guidance of the winding tube 4, particularly in the assembled configuration of the occultation device 3**.

Advantageously, the torque support 21 of the electromechanical actuator 11 may allow the first end **17*a* of the casing 17** to be shuttered.

In addition, the torque support 21 of the electromechanical actuator 11 can support at least part of the electronic control unit 15.

Advantageously, the torque support 21 is fixed to the casing 17 by means of one or more fastening elements 54, in particular in the assembled configuration of the electromechanical actuator 11. The fastening element(s) 54 may be, for example, bosses, as illustrated in FIGS. 3, 5, 6 and 8, fastening screws, elastic snap-in fastening elements, grooves in indentations, or a combination thereof.

Advantageously, the torque support 21 comprises a first part 21*a*, called the inner part, and a second part 21*b*, called the outer part.

Advantageously, the first part 21*a* of the torque support 21 is configured to collaborate, i.e. collaborates, with the casing 17 of the electromechanical actuator 11, in particular in the assembled configuration of the electromechanical actuator 11. Furthermore, the second part 21*b* of the torque support 21 is configured to collaborate, i.e. collaborates, with the holding device 9, 23, in particular in an assembled configuration of the electromechanical actuator 11 in the occultation device 3.

Advantageously, the construction of the torque support 21 comprising the first and second parts 21*a*, 21*b* made of a single piece improves the rigidity of the torque support 21.

Advantageously, at least a portion of the first part 21*a* of the torque support 21 is generally cylindrical in shape and is arranged within the casing 17 of the electromechanical actuator 11, particularly in the assembled configuration of the electromechanical actuator 11.

Advantageously, an outer diameter of at least a portion of the second part 21*b* of the torque support 21 is larger than an outer diameter of the casing 17 of the electromechanical actuator 11.

Advantageously, the torque support 21 further comprises a limit stop 33. Furthermore, the stop 33 is in abutment, i.e. is configured to be in abutment, with the casing 17, at the first end 17*a* of the casing 17, particularly in the assembled configuration of the electromechanical actuator 11.

Thus, the limit stop 33 of the torque support 21 makes it possible to limit the depression of the first part 21*a* of the torque support 21 into the casing 17, along the direction of the axis of rotation X.

Furthermore, the limit stop 33 of the torque support 21 delimits the first and second parts 21*a*, 21*b* of the torque support 21 from each other.

Thus, only the first portion 21*a* of the torque support 21 is arranged inside the casing 17 of the electromechanical actuator 11, following the fitting of the torque support 21 inside the casing 17, up to the limit stop 33, particularly in the assembled configuration of the electromechanical actuator 11, and the second portion 21*b* of the torque support 21 extends outside the casing 17.

Here, the limit stop 33 of the torque support 21 comprises a shoulder and, more particularly, it is made in the form of a flange, in particular of cylindrical shape and with a straight generatrix.

Here and as illustrated in FIGS. 3 to 5 and 8, the ring 53 is inserted around the torque support 21, particularly the second part 21*b* of the torque support 21, particularly in the assembled configuration of the electromechanical actuator 11.

In a variant not shown, the ring 53 is inserted around a first end 17*a* of the casing 17 of the electromechanical actuator 11, particularly in the assembled configuration of the electromechanical actuator 11.

Advantageously, the output shaft 20 of the electromechanical actuator 11 is arranged inside the winding tube 4 and at least partly outside the casing 17 of the electromechanical actuator 11.

Here, one end of the output shaft 20 protrudes from the casing 17 of the electromechanical actuator 11, in particular from a second end 17*b* of the casing 17 opposite the first end 17*a*.

Advantageously, the output shaft 20 of the electromechanical actuator 11 is configured to rotate a connecting element, not shown, connected to the winding tube 4. The connecting element is in the form of a wheel.

When the electromechanical actuator 11 is switched on, the electric motor 16 and the gearbox rotate the output shaft 20. In addition, the output shaft 20 of the electromechanical actuator 11 rotates the winding tube 4 via the connecting element.

Thus, the winding tube 4 rotates the screen 2 of the occultation device 3, so that the opening 1 is opened or closed.

The electronic control unit 15 of the electromechanical actuator 11 comprises a device to detect obstacles and end-of-travel, not shown, during the winding of the screen 2 and during the unwinding of that screen 2.

The device to detect obstacles and end-of-travel during the winding and unwinding of the screen 2 is implemented by means of the microcontroller 30 of the electronic control unit 15 and, in particular, by means of an algorithm implemented by this microcontroller 30.

Here, the electronic control unit 15, in particular the first and second electronic boards 15*a*, 15, are supplied with electrical energy by means of the power supply lead 18.

Advantageously, the electronic control unit 15 is arranged at least partly inside the casing 17 of the electromechanical actuator 11.

Furthermore, the electronic control unit 15 may be at least partly arranged outside the casing 17 of the electromechanical actuator 11 and, in particular, mounted in the torque support 21.

Here, the first electronic board 15*a* of the electronic control unit 15 is arranged inside the casing 17 of the electromechanical actuator 11, particularly in the assembled configuration of the electromechanical actuator 11. Furthermore, the second electronic board 15*b* is arranged within the torque support 21 of the electromechanical actuator 11, particularly in the assembled configuration of the electromechanical actuator 11.

Here, the electronic control unit 15 does not have a casing for receiving the first electronic board 15*a*. This first electronic board 15*a* is, on the one hand, held, in particular plugged, in the torque support 21, in particular in a third part 21*c* of the torque support 21, called the central part, as illustrated in FIG. 4, and on the other hand, held, in particular plugged into a support, not shown, mounted at the end of the electric motor 16, particularly in the assembled configuration of the electromechanical actuator 11.

Here, the second electronic board 15*b* is held, in particular plugged, in a central rib of the torque support 21, particularly in a central rib of the second part 21*b* of the torque support 21.

In particular, the second electronic board 15*b* is arranged inside a housing 44 formed in the second part 21*b* of the torque support 21, more precisely in a head 21*e* of the second part 21*b*. The housing 44 is delimited, along the axis X, on the one hand by a wall 21*d* of the torque support 21, visible in FIGS. 4 and 6 to 8 and which forms, along the axis X, one end of the head 21*e* of the second part 21*b* of the torque support 21, and on the other hand by a wall 21*f* of the torque support 21, visible in FIGS. 6 and 7, substantially parallel to the wall 21*d* and arranged, along the axis X, between the wall 21*d* and the first internal part 21*a* of the torque support 21. Furthermore, the outer surface of the head 21*e* of the second part 21*b* is cylindrical in shape.

Advantageously, the first and second electronic boards 15*a* and 15*b* are connected to each other by connecting cables, not shown.

In addition, the electronic board 15*b* comprises a connector 19, which is mounted on the printed circuit board 40*b* and allows the connection of the connecting cables between the first and second electronic boards.

Figure 8:
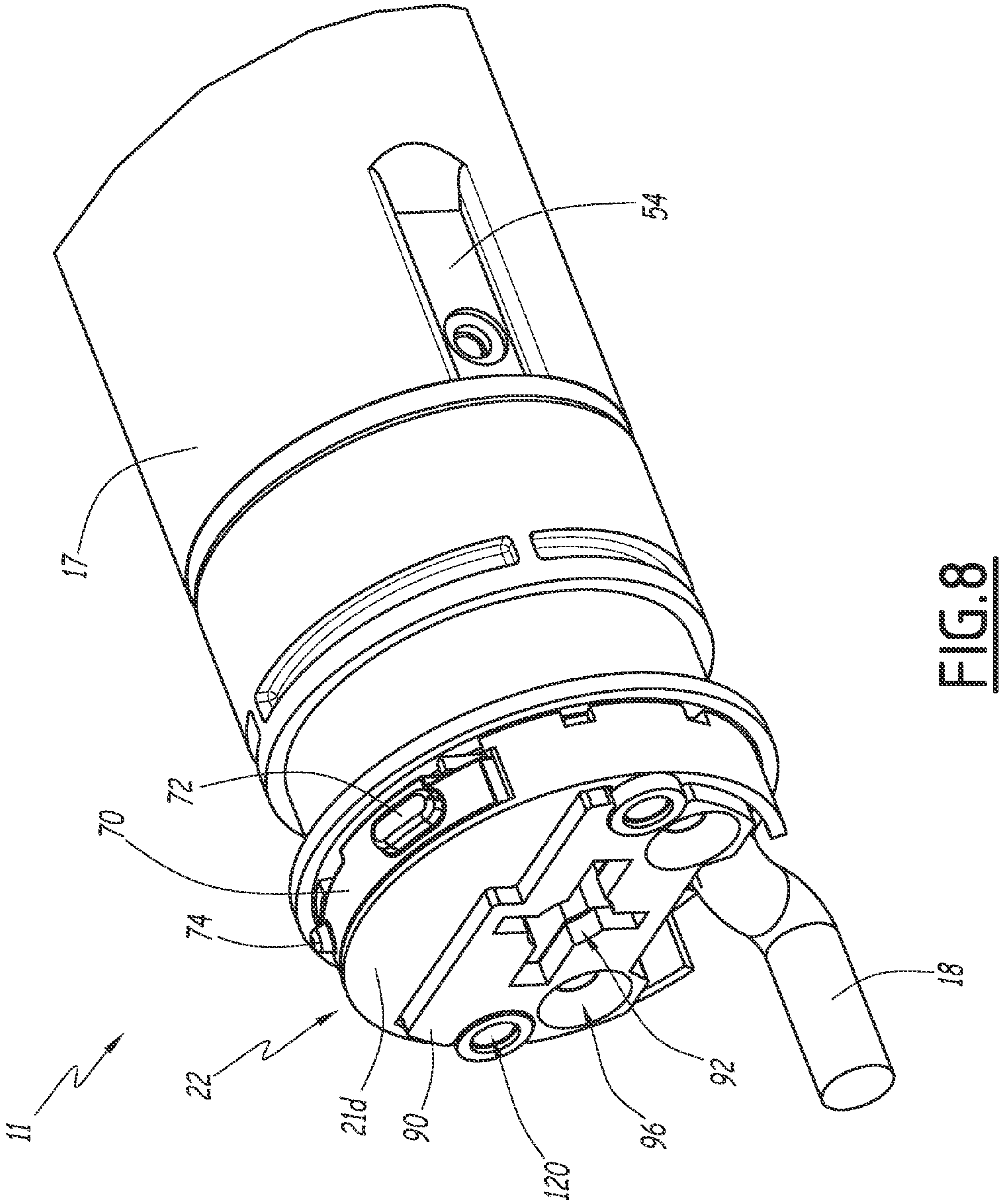
FIG. 8 is a perspective view of the same end of another part of the electromechanical actuator of FIGS. 3 and 4, shown from the angle of FIG. 5.

Here and as illustrated in FIG. 3, the torque support 21 further comprises a cover 22. The cover 22 is mounted on the end of the second part 21*b* of the torque support 21, more precisely on the head 21*e* of the second part 21*b*, in particular in the assembled configuration of the electromechanical actuator 11. Furthermore, the cover 22 closes the housing 44 in the assembled configuration of the electromechanical actuator. In FIGS. 4 and 8, the cover 22 is omitted for clarity.

The torque support 21 comprises at least one selection device 41, in particular a button, which may be, for example, a push button.

Said selection device(s) 41 are configured to, when activated, carry out an adjustment of the electromechanical actuator 11 through one or more configuration modes, to pair with the electromechanical actuator 11 one or more command units 12, 13, to reset one or more parameters, which may be, for example, an end position, to reset the paired command unit or units 12, 13 or to control the movement of the screen 2.

Here, the torque support 21 comprises a single selection device 41.

The number of selection devices of the torque support is not limiting and may be different. It may in particular be greater than or equal to two.

The torque support 21 comprises at least one display device 42.

This display device or these display devices 42 are configured to display a visual indication, which may be, for example, representative of an operating mode of the electromagnetic actuator 11, in particular a configuration mode or a control mode, or of a status of a member of the motorized driving device 5 or of the electrical energy supply device 31, in particular a charging status of the battery 24.

Advantageously, the display device 42 comprises at least one illumination source, not shown, in particular a light-emitting diode, mounted on a second electronic board 15*b*.

Here, the torque support 21 comprises a single display device 42.

The number of display devices is not limiting and may be different. It may in particular be greater than or equal to two.

Advantageously, the selection device 41 and the display device 42 are electrically connected, i.e. are configured to be electrically connected, to the electronic control unit 15.

Here, the selection device 41 and the display device 42 are electrically connected, i.e. are configured to be electrically connected, to the second electronic control board 15*b*.

Advantageously, the selection device 41 and the display device 42 are mounted on the printed circuit board 40*b*.

In a variant, the selection device 41 and/or the display device 42 may be electrically connected, i.e. may be configured to be electrically connected, to the first electronic control board 15*a*.

The torque support 21 may comprise either the selection device(s) 41 or the display device(s) 42, or the selection device(s) 41 and the display device(s) 42.

The housing 44 accommodates, i.e. is configured to accommodate, at least the selection device(s) 41 or display device(s) 42, in particular in the assembled configuration of the electromechanical actuator 11.

In this way, the housing 44 receives, i.e. is configured to receive, at least one of the selection device(s) 41 or display device(s) 42, in particular in the assembled configuration of the electromechanical actuator 11.

Here, the torque support 21 comprises a single housing 44, where the selection device 41 and the display device 42 are housed.

Advantageously, the electromechanical actuator 11 further comprises a hood 70, which is partially inserted in the housing 44 and closes this housing 44, the hood surrounding the second electronic board 15*b*.

Here, the hood 70 comprises a button 72, configured to operate the selection device 41 upon a user's touch.

In addition, the hood 70 comprises a light guide 74, configured to guide light emitted by the display device 42 to the exterior of the electromechanical actuator 11.

Here, the hood 70 is surrounded by the cover 22, so that it is covered by the cover. In particular, the cover covers and conceals the junction lines between the hood 70 and the walls 21*d* and 21*f* of the housing 44. Thus, in the assembled configuration of the electromechanical actuator 11, the hood 70 cannot be removed. When the cover 22 is removed, then the hood 70 can be removed from the housing 44, to make the second electronic board 15*b* accessible.

In other words, the cover 22 protects the second electronic board 15*b* and the hood 70.

Advantageously, in a variant not shown, the hood 70 is configured to protect the second electronic board 15*b* from electrostatic discharges, by increasing a creeping path travelled by an electrostatic discharge, between the outside of the hood 70 and the second electronic board 15*b*, and possibly to protect the second electronic board 15*b* from water and humidity. The cover then has a solid outer surface and the activation of the selection device 41 is done by movement of the hood itself or by deformation of a flexible part of the hood at the detection device.

The absorption of the loads applied by the electromechanical actuator on the structure of the building B, ensured by the torque support 21, is in practice achieved by preventing the rotation of the torque support 21, about an axis X21 of the torque support coinciding with the axis of rotation X in the assembled configuration of the actuator 11, with respect to the building B.

This locking of the rotation of the torque support 21, and thus of the rotation of the fixed elements of the electromechanical actuator 11, such as the casing 17, is achieved by the collaboration of the torque support with the holding device 9, 23, in particular in an assembled configuration of the electromechanical actuator 11 in the occultation device 3.

In practice the torque support 21 comprises an opening 80, which extends into the torque support 21 from the torque support wall 21*d*, parallel to the axis X21.

Here, the opening 80 comprises a central portion 80*a* and four arms 80*b*, arranged perpendicular to each other around the central portion 80*a*. Thus, in the example, the opening 80 has the shape of a cross.

In a variant, the opening 80 has a different shape, for example a five-pointed star shape, a triangular shape or another polygonal shape.

The opening 80 is configured to receive, i.e. receives, a part of the holding device 9, 23, and more particularly a projecting part of a fixed support 23.

In the variant illustrated in FIG. 2, where the fixed supports 23 are not used and the winding tube 4 is held via the cheeks 10 of the box 9, the opening 80 is configured to receive a projecting part of an attachment bracket attached to a cheek 10 of the box 9. For the sake of simplicity, such an attachment bracket will be referred to as a fixed support 23 in the rest of the description.

It is known that a wide variety of fixed supports 23 with different shapes can be used within the holding device 9, 23 to hold the winding tube 4.

To avoid having to adapt the shape of the opening 80 to the shape of the fixed support 23 of the installation 6, which would imply a large variety of models of torque supports 21 that could fit all shapes of fixed supports 23, the torque support further comprises a mounting plate 90.

The mounting plate 90 of the torque support 21 is fixed to the wall 21*d* of the torque support and is provided with an opening 92, which is aligned with the opening 80 of the torque support and the shape of which is adapted to that of the projecting part of the fixed support 23, i.e. complementary to the shape of the fixed support 23.

Figure 7:
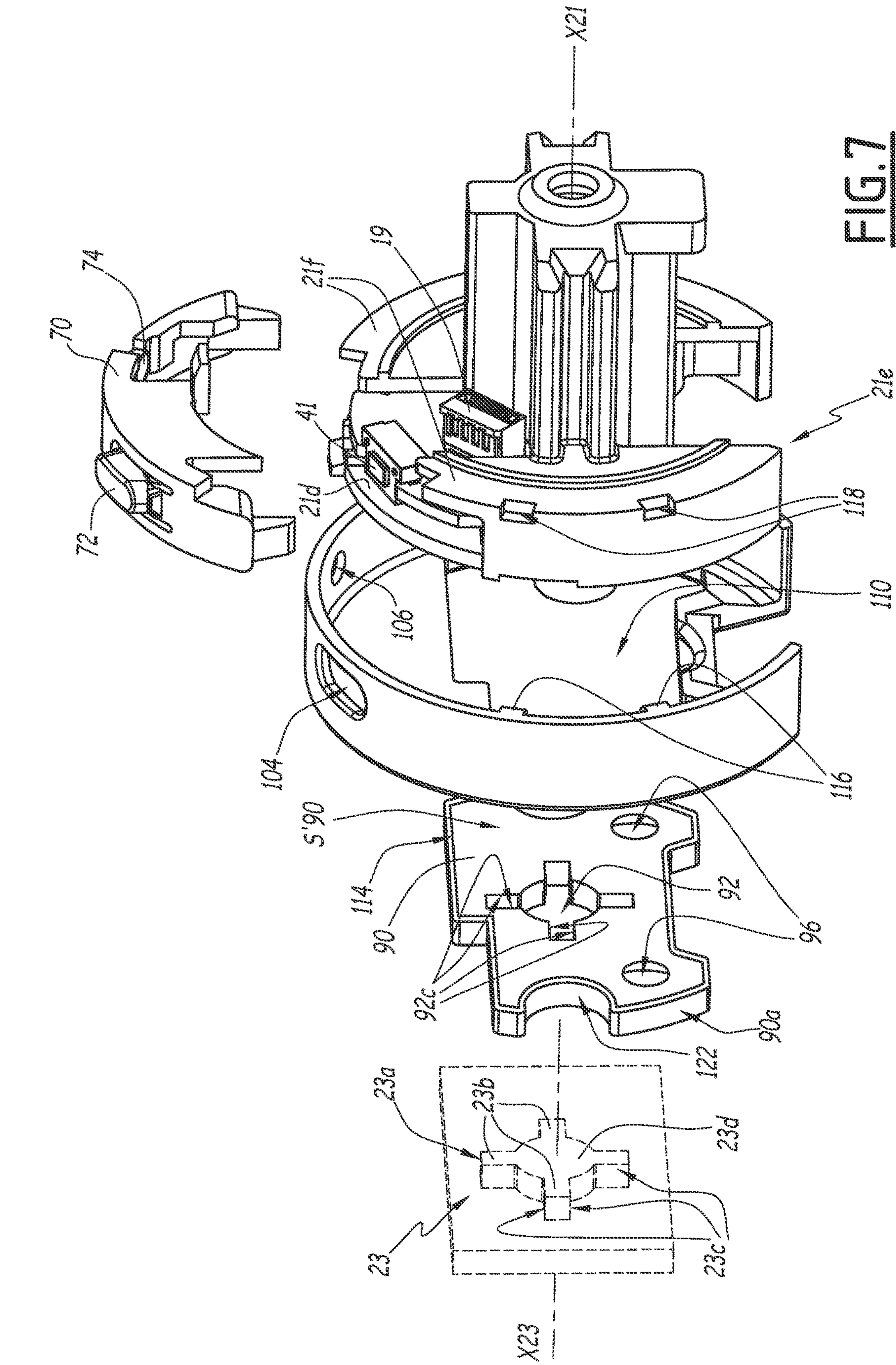
FIG. 7 is an exploded perspective view of the same end of the electromechanical actuator of FIG. 6, shown from another angle.

In FIG. 7, the outline of a fixed support 23 and its projecting part 23*a* is illustrated in mixed lines, for illustrative purposes. Here, the fixed support 23 is plate-shaped and its projecting part 23*a* extends perpendicular to the support, along an axis X23, with a cross-section in the shape of a four-branched cross 23*b*, each branch being defined between two surfaces 23*c*. The projecting part 23*a* further comprises a circular central part 23*d* from which the branches 23*b* extend.

Here, the opening 92 of the mounting plate 90 comprises a central part 92*a* and four arms 92*b*, arranged perpendicular to each other around the central part 92*a*. Thus, in the example, the opening 92 has the shape of a cross.

In addition, each arm 92*b* has two bearing surfaces 92*c*.

A "bearing surface" is defined as any surface of the opening 92 of the mounting plate 90 that generates a torque to rotate the torque support 21 when a force is applied to it, i.e. any surface that transmits a force to a surface bearing against it when the torque support rotates, which force opposes the rotation of the torque support.

Thus, the opening 92 receives the projecting part 23*a* of the fixed support 23 and the bearing surfaces 92*c* of the opening 92 are in contact with the surfaces 23*c* of the projecting part 23*a* of the fixed support 23, at close operating clearance, so that rotation of the torque support 21 about the axis X21 is prevented in the mounted configuration of the electromechanical actuator 11 in the installation 6.

Thus, the opening 80 of the torque support 21 has a generic shape, intended to be able to receive various parts projecting from the fixed support 23 of different shapes, and the locking of the rotation of the torque support 21 is ensured by the opening 92 of the mounting plate 90, which is specifically adapted to the projecting part 23*a*.

Furthermore, the outline of the opening 92 of the mounting plate 90, projected in a plane perpendicular to the axis X21, is inscribed in the outline of the opening 80 of the torque support 21, projected in the same plane. In other words, a plurality of openings 92 are compatible with the opening 80 of the torque support, so that a plurality of plates 90 are compatible with the torque support 21 and thus enable the forces exerted by the electromechanical actuator 11 to be taken up by collaboration with the projecting part 23*a* of the fixed support 23.

It is advantageous to provide that the torque support 21 is prevented from rotating through the opening in the mounting plate 90 rather than directly through the opening 80 in the torque support, as the mounting plate 90 is inexpensive and easier to manufacture. This makes it easy to provide a wide variety of mounting plates 90, each adapted to a type of fixed support 23, more particularly to a geometry of the projecting part 23*a*, thus allowing a single torque support 21 to be adapted to a wide variety of fixed supports 23.

Another advantage of this system is that it allows a different material to be used for the mounting plate 90 and for the torque support 21. Indeed, as the mounting plate is subject to greater forces than the torque support, generated by the reaction of the fixed support 23 when the electromagnetic actuator 11 is in operation, it is preferable that the material of the mounting plate 90 is very strong, in particular harder than the material of the torque support 21.

Here, hardness is understood to be the mechanical resistance of a material against penetration.

For example, the mounting plate is made of a metallic material, e.g. stainless steel, which has good mechanical properties, i.e. is wear-resistant, and the torque support is made of a polymeric material, preferably by moulding, which makes it possible to produce a complex shape at low cost.

Advantageously, the mounting plate 90 is a single piece.

In practice, the mounting plate 90 is obtained by machining a solid plate, into which the mounting plate is cut, and then into which the opening 92 is cut.

The mounting plate 90 then defines an outer surface S90 and an inner surface S'90, which are substantially flat, have no relief and are parallel to each other.

The term "have no relief" means that the mounting plate 90 does not comprise any protrusions extending from the faces S90 and S'90.

In a variant, the mounting plate is made of a rigid polymer material.

In addition, the mounting plate 90 is attached to the torque support 21 by means of fastening elements, such as screws, illustrated in the figures by their axis lines 95.

In practice, the torque support 21 comprises holes 94 and the mounting plate 90 comprises holes 96, the holes 94 and 96 being adapted to receive the screws 95.

Advantageously, and more particularly when the fastening elements are tapered head screws, the holes 96 of the mounting plate each comprise a countersink, configured to accommodate the head of a tapered screw, such that this head does not protrude from the mounting plate 90.

Here, the torque support 21 and the mounting plate 90 each comprise two holes 94, 96. In a variant, the number of holes 94, 96 is different, for example three holes 94 and three holes 96.

Attaching and removing the mounting plate 90 to the torque support 21 is therefore particularly simple, as it is done using simple and quick fastening elements. Thus, it is easy to change the mounting plate installed on the torque support 21, for example if, during the installation of the electromechanical actuator 11, the user finds that the mounting plate 90 does not fit the fixed support 23.

Figure 5:
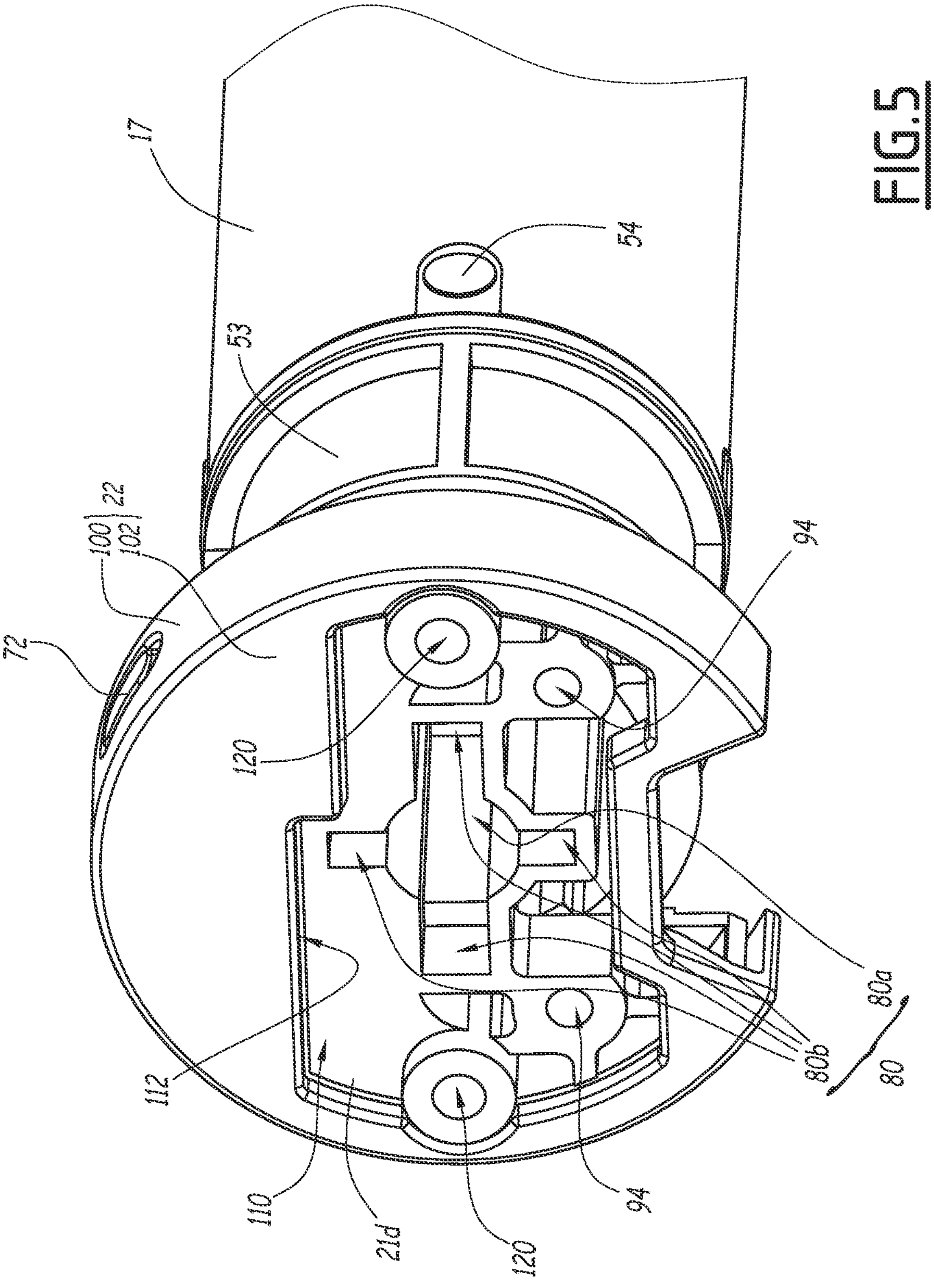
FIG. 5 is a partial perspective view of an end of the part of the electromechanical actuator of FIGS. 3 and 4.
Figure 6:
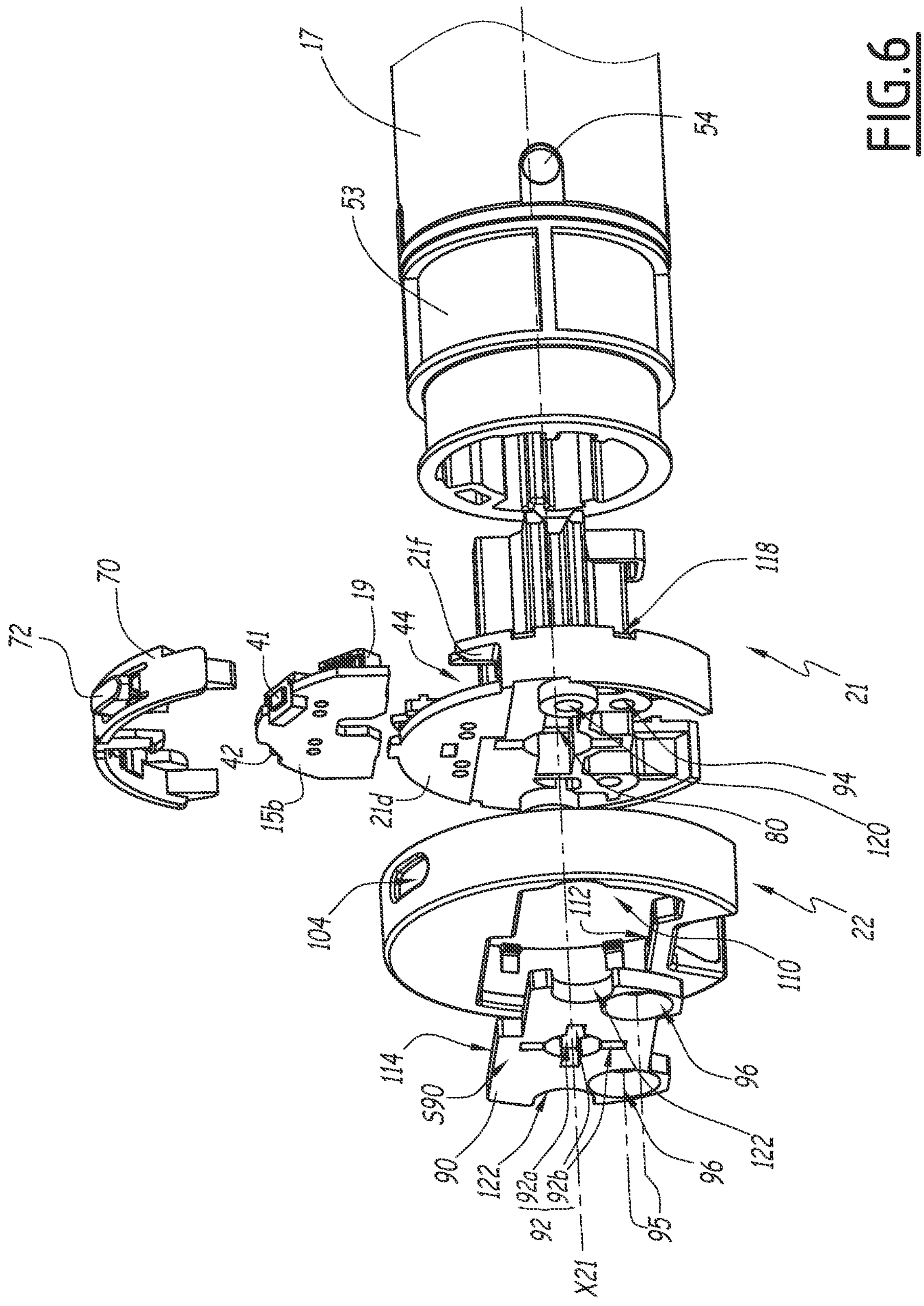
FIG. 6 is an exploded perspective view of one end of the electromechanical actuator of FIGS. 3 to 5, including the part illustrated in FIG. 5.

As can be seen in FIGS. 5 to 7, the cover 22 is cylindrical in shape, with a base 100 and a lateral face 102.

In the assembled configuration of the electromechanical actuator 11, the lateral face 102 is parallel to, and in contact with, the wall 21*d* of the torque support 21.

Here, the lateral face 102 comprises an opening 104 arranged opposite the selection device 41 when the cover 22 is mounted on the torque support 21, so that the selection device 41 is accessible and activatable through the opening 104, from outside the electromechanical actuator 11.

In practice, the button 72 of the hood 70 extends through the opening 104 to allow actuation of the selection device 41.

Similarly, the lateral face 102 comprises an opening 106 arranged opposite the display device 42 when the cover 22 is mounted on the torque support 21, so that a visual indication emitted by the display device 22 is visible through the opening 106 from outside the electromechanical actuator 11.

In practice, the light guide 74 of the hood 70 extends through the opening 106 to transmit the visual indication emitted by the display 22 through the cover 22.

Thus, the openings 104 and 106 allow the second electronic board 15*b* to be connected to the exterior of the electromechanical actuator 11, facing the electronic components carried by the second electronic board.

In practice, the number of openings 104, 106 of the cover 22 is adapted to the number of selection devices 41 and display devices 42 of the second electronic board 15*b*. For example, if the electronic board does not comprise a display device 42, then the cover 22 does not comprise an opening 106.

The lateral face 102 of the cover 22 comprises a cutout 110, in which the mounting plate 90 is mounted.

Advantageously, the shape of the cutout 110 is complementary to the shape of the mounting plate 90. The cover 22 and the mounting plate 90 are therefore complementary to conceal the head 21*e* of the torque support 21.

Thus, in the assembled configuration of the electromechanical actuator 11, the mounting plate 90 does not protrude from the cover 22 and the outer surface S90 of the mounting plate is flush with the lateral face 102.

"Flush" means that the distance between the outer surface S90 of the mounting plate 90 and the lateral face 102 of the cover 22, measured along the axis of rotation X, is less than 2 mm, preferably less than 1 mm.

The fact that the outer surface S90 of the mounting plate 90 is flush with the lateral face 102 of the cover 22 is particularly advantageous, as it minimises the distance between the fixed support 23 and the electromechanical actuator 11, thus avoiding light leakage around the screen 2, when the screen 2 is in the unrolled position, particularly when the installation 6 does not comprise lateral slides 26. The electromechanical actuator 11 is also more aesthetically pleasing.

Advantageously, the lateral face 102 of the cover 22 comprises a rim 112, i.e. a rabbet, arranged around the cutout 110. In practice, the rim 112 is an overhang that extends the lateral face 102 towards the cutout 110 over part of the thickness of the lateral face 102.

Furthermore, the mounting plate 90 is advantageously provided with a shoulder 114, provided along an outer edge 90*a* of the mounting plate, the edge 90*a* being directed towards the wall 21*d* of the torque support 21.

Furthermore, the shoulder 114 and the rim 112 are complementary in shape, so that in the assembled configuration of the electromechanical actuator 11, the shoulder rests on the rim and can exert on it a force parallel to the axis X21 and directed towards the casing 17.

Thus, when the mounting plate 90 is attached to the wall 21*d* of the torque support 21, the cover 22 is retained by the mounting plate by its edge, in contact against the shoulder.

The mounting plate 90 therefore also holds the cover 22 assembled on the torque support 21.

In a variant, the rim 112 of the lateral face 102 is provided on only part of the cutout 110 and the shoulder 114 is provided on only part of the outer edge 90*a* of the mounting plate 90. For example, the rim 112 is formed on the cutout 110 in two portions, each portion being between five and twenty millimetres in length, and the shoulder is formed on the edge 90*a* in two portions, each portion being between five and twenty millimetres in length.

In a variant, the mounting plate 90 does not comprise a shoulder 114. The outer edge 90*a* then rests against the rim 112 of the cover 22, so as to hold the cover assembled on the torque support 21. Advantageously, in such an embodiment, the thickness of the mounting plate 90, measured along the axis X21, i.e. the distance between the surfaces S90 and S'90, is equal to or smaller than the thickness of the lateral face 102 of the cover 22, measured along the axis X21, so that the outer surface S90 of the mounting plate is flush with the lateral face 102. This maximises the rigidity of the mounting plate.

Here, the cover 22 also comprises lugs 116, which are received in recesses 118 of the torque support 21, so that the cover 22 is snapped onto the torque support 21.

Thus, the cover 22 is mounted on the torque support 21 in two steps: first it is snapped on with the lugs 116 and then secured with the mounting plate 90.

In addition, the cover 22 is removed from the torque support in two steps: first the mounting plate 90 is removed and then the lugs 116 are moved away from the recesses 118, either with a tool, such as the tip of a flathead screwdriver, or by resilient deformation of the cover.

This assembly and disassembly has the advantage of being particularly simple, which allows the cover 22 to be easily replaced.

Thus, the cover 22 is easily changed, for example to change the colour or material, according to the preferences of a user of the installation 6.

In a variant, the cover 22 is only held by latching onto the torque support 21. Advantageously, in such an embodiment the mounting plate 90 does not comprise a shoulder 114 and the cover 22 does not comprise a rim 112. Furthermore, in such an embodiment the cover 22 can be mounted and dismounted independently of the mounting plate 90, i.e. the cover can be mounted and dismounted whether the mounting plate is mounted or dismounted. Similarly, the mounting plate 90 can be mounted and dismounted independently of the cover 22. Thus, the cover 22 and the mounting plate 90 are independently interchangeable.

In summary, the electromechanical actuator 11 is particularly advantageous because it is simple to adapt to a fixed support 23, regardless of the type of fixed support 23, and it is simple to customise, thanks to the mounting plate 90 and the cover 22, which are easily interchangeable.

In addition, the mounting plate 90 and/or the cover 22 can be changed without disassembling or modifying the torque support 21 or disconnecting the electrical connections at the torque support. This is particularly advantageous as the torque support 21 is more complex and risky to remove, due to the presence of the electronic boards 15*a* and 15*b* attached to it and due to the connections, for example at the connector 19, which must be disconnected when removing the torque support and which may be sensitive.

Furthermore, when the mounting plate 90 is removed from the torque support 21, only a portion of the wall 21 of the opening 80 is accessible from outside the electromechanical actuator 11. Thus, in this configuration, no fragile parts of the electromechanical actuator, such as for example the electronic control unit 15 and especially the second electronic board 15*b* and the connector 19, are accessible. Changing the mounting plate 90 thus does not pose any risk of damaging the electromechanical actuator. This advantage is particularly apparent from the fact that the dimensions of the mounting plate 90 are small compared to the size of the torque support 21, as the plate only covers part of the wall 21*d* of the torque support 21. The same advantage is present when the cover 22 is removed, due to the fact that the electronic board 15*b* is kept in the housing 44, closed by the hood 70, and the face 21*d* of the housing limits access to the electronic board 15*b* when the cover 22 is removed.

Advantageously, the torque support 21 also comprises brackets 120, which extend from the wall 21*d* parallel to the axis X21.

In the example, the torque support 21 comprises two brackets 120.

The brackets 120 form members, independent of the mounting plate 90, for holding the torque support 21 relative to the fixed support 23 and preventing rotation of the torque support 21 about the axis X21. For example, the brackets 120 are configured to receive two attachment pins belonging to the fixed support 23 and extending parallel to the axis X23.

Thus, the torque support 21 offers two different mounting options for the fixed support 23.

Advantageously, the mounting plate 90 also comprises two indentations 122, the shape of which is complementary to the shape of the brackets 120. When the mounting plate 90 is attached to the torque support 21, the brackets 120 of the torque support are arranged in the indentations 122, so that the mounting plate 90 partially surrounds the brackets and the brackets 120 are flush with the outer surface S90 of the mounting plate, as best seen in FIG. 8. This allows the brackets 120 to be left free if necessary.

Figure 9:
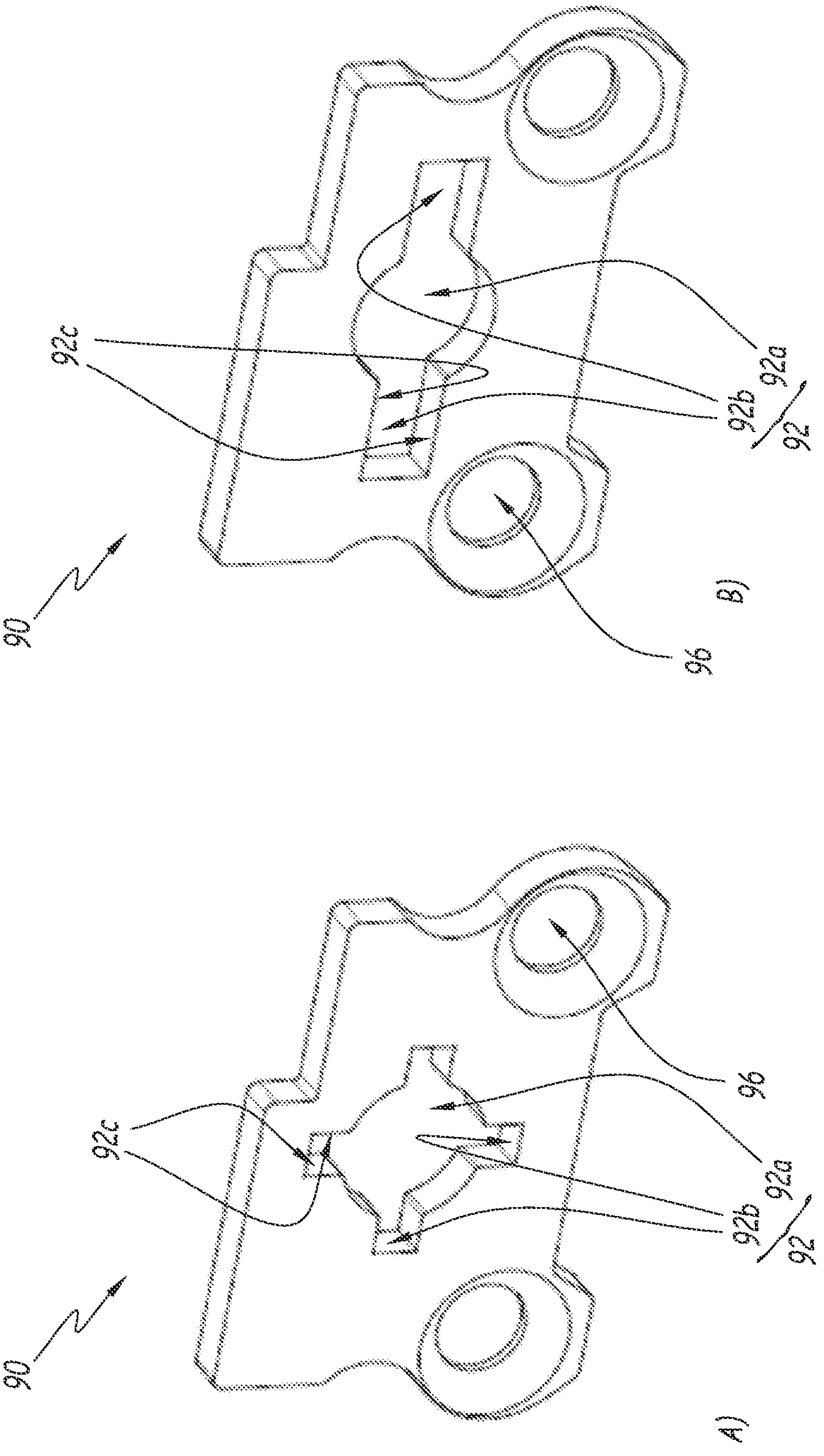
FIG. 9 is a perspective view of the two mounting plates according to two variants of the invention.

Two variants of the mounting plate 90 are now described with reference to the inserts A) and B) in FIG. 9, and more specifically the differences between these two variants and the mounting plates 90 illustrated in FIGS. 3, 6, 7 and 8.

The opening 92 of the mounting plate 90 of insert A) comprises four arms 92*b* arranged around the central portion 92*a*, of substantially the same length as the mounting plate in FIGS. 6 and 7. Compared to the central part 92*a* of the mounting plate of FIGS. 6 and 7, the central part of the mounting plate of insert A) is larger, i.e. it can accommodate a projecting part 23*a* whose circular central part 23*d* has a larger diameter, while the arms 92*b* are shorter.

The opening 92 of the mounting plate 90 of the insert B) comprises only two arms 92*b* arranged around the central portion 92*a* and diametrically opposed. Furthermore, compared to the arms 92*b* of insert A), the arms of the mounting plate of insert B) are wider, i.e. the distance between the two bearing surfaces 92*c* of each arm, measured perpendicularly to these bearing surfaces, is greater. Thus, the opening 92 can accommodate a projecting part 23*a* with thicker branches 23*b*. Similarly, the lengths of the arms 92*b* are greater than the lengths of the arms of the insert A)

Numerous modifications can be made to the above-described embodiments without departing from the scope of the invention.

In a variant, the projecting part 23*a* of the support has a different geometry, for example with a star-shaped cross-section, a cross-section with two or three branches, or a polygonal cross-section. In this case the geometry of the opening 92 is adapted. The opening 92 then comprises a different number of arms 92*b*, for example two arms or three arms, or a different shape, such as a triangular shape. The opening of the mounting plate 92 must in all cases remain compatible with the opening 80 of the torque support, i.e. the shape of the opening 92 fits into the shape of the opening 80 of the torque support.

Regardless of the shape of the opening 92, the opening has at least one supporting surface 92*c*.

In a variant, not shown, the opening 110 in the cover 22 is substantially equal to the perimeter of the mounting plate 90, so that the mounting plate fits into the opening in the cover 22 without the torque support 21 being visible between the cover and the mounting plate. In this embodiment, the mounting plate 90 does not comprise a shoulder and the cover opening does not comprise a rim. The plate simply fits into the opening of the cover and both can be removed separately.

In a variant, not shown, the electromechanical actuator 11 is inserted in a rail, in particular of square or rectangular cross-section, which can be opened at one or both ends, particularly in the assembled configuration of the occultation device 3. In addition, the electromechanical actuator 11 may be configured to drive a drive shaft on which cords for moving and/or orienting the screen 2 are wound.

Furthermore, the contemplated embodiments and variants may be combined to form new embodiments of the invention, without departing from the scope of the invention.

The invention claimed is:

1. An electromechanical actuator for driving a winding tube of a closure, occultation or solar protection system, the electromechanical actuator comprising at least:

a casing, a torque support, the torque support being arranged at a first end of the casing, the torque support comprising:

a first part arranged inside the casing; and a second part extending outside the casing an electrical power supply lead, the power supply lead being configured to be connected to an electrical energy supply network, an electric motor, the electric motor being mounted within the casing, the electric motor being supplied with electrical power via the electrical power supply lead, an electronic control unit comprising at least one electronic board, a cover, the cover being mounted on a head of the torque support, comprising a base and a lateral face, the head of the torque support being part of the second part of the torque support, wherein the electronic board is arranged inside a housing of the torque support, the cover closing the housing of the torque support, wherein the torque support comprises a mounting plate, the mounting plate being attached to one end of the head of the torque support by being mounted in a cutout of the lateral face of the cover, and wherein the mounting plate is provided with an opening configured to collaborate with a projecting part of a fixed support of a holding device to take up forces exerted by the electromechanical actuator.

2. An occultation device for a closure, occultation or solar protection installation, said occultation device comprising:

a winding tube;

a winding screen on the winding tube;

the electromechanical actuator of claim 1, the electromechanical actuator being configured to move the screen and a holding device including at least one fixed support, wherein the opening of the mounting plate is complementary in shape to a shape of a part projecting from the at least one fixed support and configured to receive said projecting part.

3. A closure, occultation or solar protection installation comprising:

a winding screen on a winding tube; and an occultation device comprising:

a winding tube;

a winding screen on the winding tube, the electromechanical actuator of claim 1, configured to move the screen and a holding device including at least one fixed support, wherein the opening of the mounting plate is complementary in shape to a shape of a part projecting from the at least one fixed support and configured to receive said projecting part.

4. The electromechanical actuator according to claim 1, wherein the mounting plate and the cover are independently interchangeable.

5. The electromechanical actuator according to claim 1, wherein an outer surface of the mounting plate is flush with the lateral face of the cover.

6. The electromechanical actuator according to claim 1, wherein the mounting plate defines an outer surface and an inner surface that are substantially flat, without relief and parallel to each other.

7. The electromechanical actuator according to claim 1, wherein the torque support further comprises an opening, configured to receive various projecting parts of supports of different shapes, and wherein the opening of the mounting plate is aligned with the opening of the torque support.

8. The electromechanical actuator according to claim 1, wherein the opening of the mounting plate comprises at least one bearing surface.

9. The electromechanical actuator according to claim 8, wherein the opening of the mounting plate comprises a plurality of arms, each of the plurality of arms having two bearing surfaces.

10. The electromechanical actuator according to claim 1, wherein the torque support comprises brackets, configured to hold the torque support relative to a holding device, wherein the mounting plate comprises indentations of complementary shape to a shape of the brackets, and wherein, in an assembled configuration of the electromechanical actuator, the brackets of the torque support are arranged in the indentations of the mounting plate.

11. The electromechanical actuator according to claim 1, wherein the base of the cover comprises at least one opening configured to face electronic components carried by the electronic board.

12. An electromechanical actuator configured for driving a winding tube of a closure, occultation or solar protection system, the electromechanical actuator comprising at least:

a casing, a torque support, the torque support being arranged at a first end of the casing, an electrical power supply lead, the power supply lead being configured to be connected to an electrical energy supply network, an electric motor, the electric motor being mounted within the casing, the electric motor being supplied with electrical power via the electrical power supply lead, an electronic control unit comprising at least one electronic board, a cover, the cover being mounted on a head of the torque support, comprising a base and a lateral face, wherein the electronic board is arranged inside a housing of the torque support, the cover closing the housing of the torque support, wherein the torque support comprises a mounting plate, the mounting plate being attached to one end of the head of the torque support by being mounted in a cutout of the lateral face of the cover, and wherein the mounting plate is provided with an opening configured to collaborate with a projecting part of a fixed support of a holding device to take up forces exerted by the electromechanical actuator, and wherein the mounting plate holds the cover assembled on the torque support.

13. The electromechanical actuator according to claim 12, wherein the cover comprises a rim, wherein the mounting plate comprises a shoulder, wherein the rim and the shoulder are of complementary shapes and wherein, in an assembled configuration of the electromechanical actuator, the shoulder abuts against the rim.

* * * * *